United States Patent

[11] 3,578,189

| [72] | Inventor | John L. Yonkers<br>2030 Sunset Ridge Road, Northbrook, Ill. 60062 |
|---|---|---|
| [21] | Appl. No. | 839,738 |
| [22] | Filed | Dec. 26, 1968<br>Division of Ser. No. 498,710, Oct. 20, 1965,<br>Pat. No. 3,468,024, Sept. 23, 1969 |
| [45] | Patented | May 11, 1971 |

[54] METHOD FOR ORIENTING AND ASSEMBLING SMALL PARTS
3 Claims, 20 Drawing Figs.

[52] U.S. Cl. ............................................. 214/152, 214/1
[51] Int. Cl. ................................................. B65g 1/00
[50] Field of Search.......................................... 214/1.1 (C), 152; 133/8, 8A—8C; 29/464, 466

[56] References Cited
UNITED STATES PATENTS

| 899,760 | 9/1908 | Remington .................. | 214/1(C) |
| 1,439,815 | 12/1922 | Haugh ......................... | (214/1CUX) |
| 1,618,390 | 2/1927 | Smith ........................... | 133/8(C)X |
| 2,355,643 | 8/1944 | Grover ......................... | 214/1(C) |
| 2,510,555 | 6/1950 | Christie ....................... | 214/1(C)X |

*Primary Examiner*—Robert G. Sheridan
*Assistant Examiner*—Frank E. Werner
*Attorney*—Mason, Kolehmainen, Rathburn & Wyss ABSTRACT: This invention relates to a method of orienting and gauging the internal and external diameters of small hollow parts. To carry out this method, a gauge plate having a plurality of upstanding gauge pins is provided. An orienting plate having a plurality of openings is placed over the gauge plate with the pins extending through a respective one of said openings. A random supply of said parts is placed over the said orienting plate which is then vibrated to simultaneously fill a majority of said openings with the hollow parts fitted over the gauge pins. The orienting plate is then removed and a transfer plate having a plurality of transfer cavities is assembled against the gauge plate with the parts supported on the gauge pins being received in said transfer cavities. The assembly of said transfer plate and said gauge plate is inverted so that the parts move into the transfer cavities and the assembly is then separated.

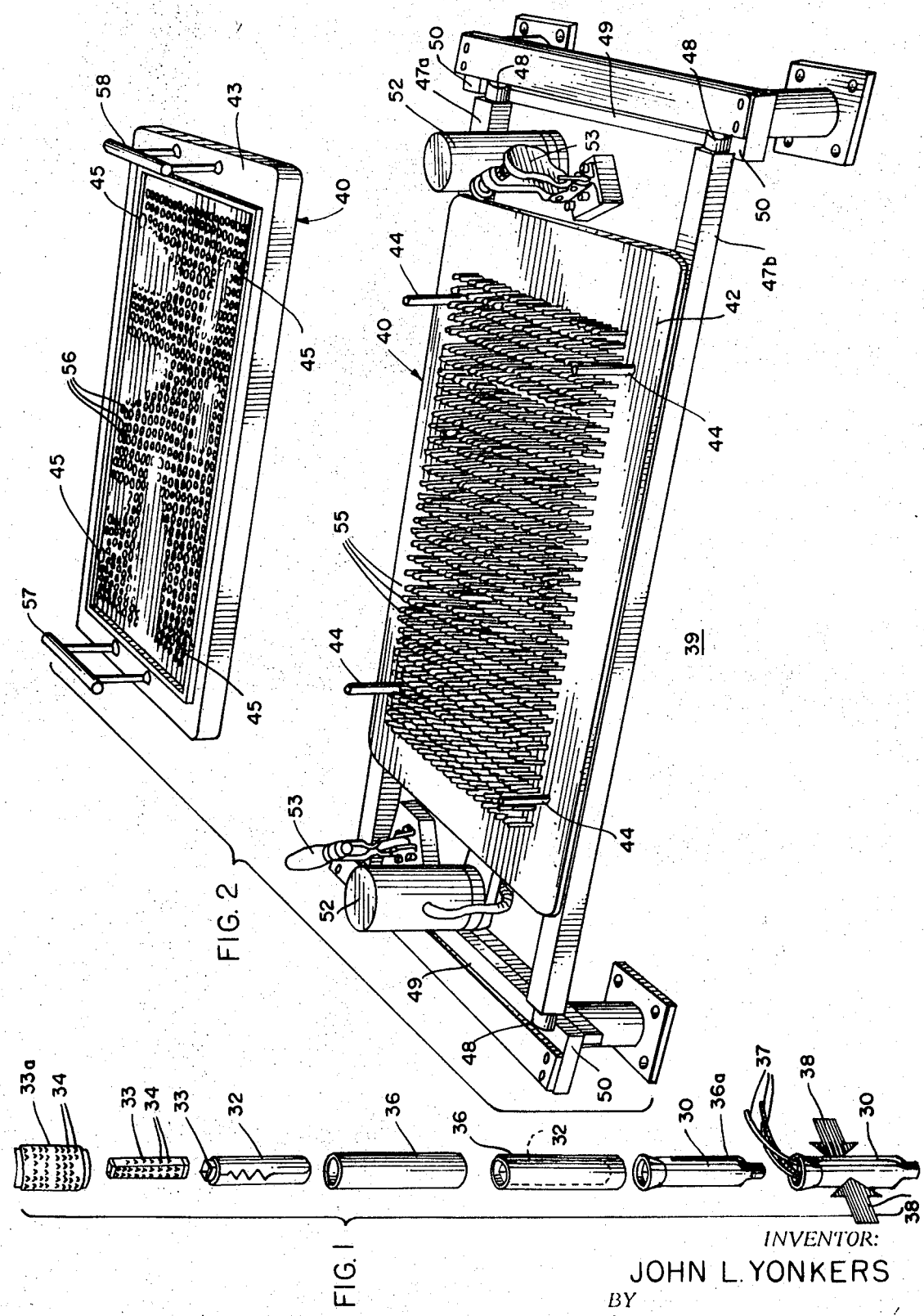

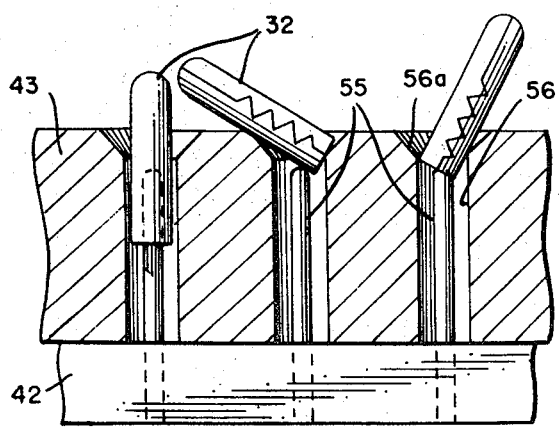
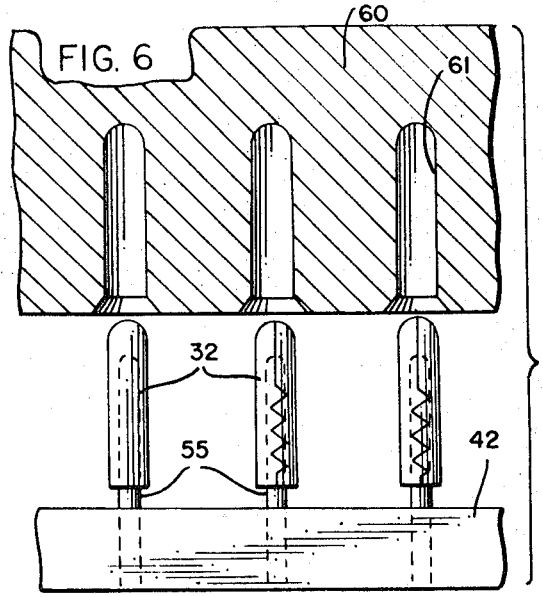
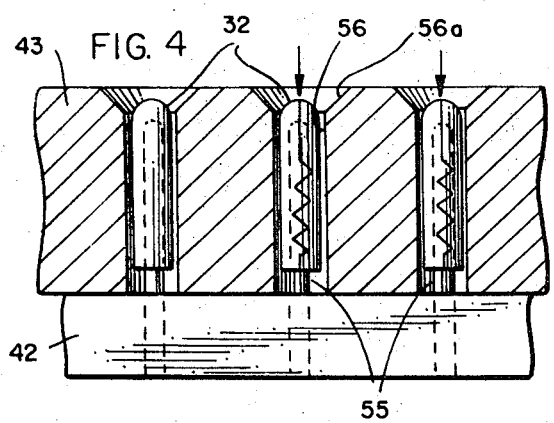
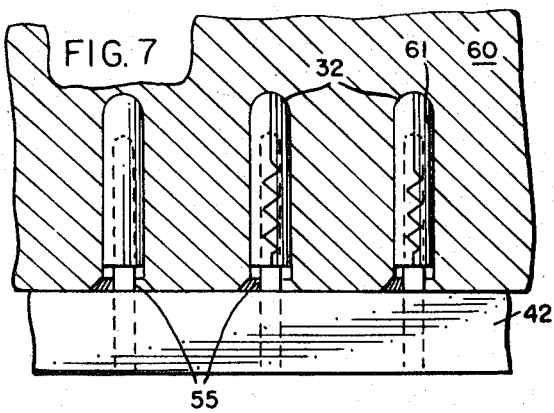
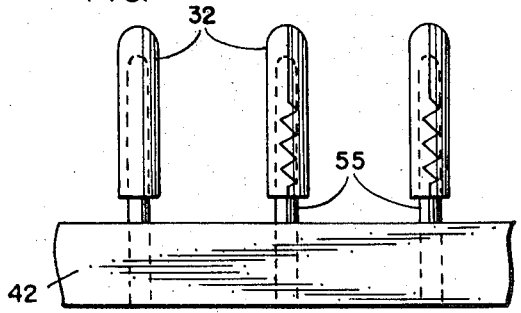
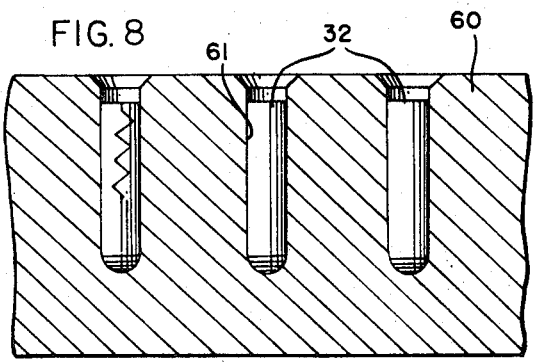
INVENTOR:
JOHN L. YONKERS Patented May 11, 1971
3,578,189
6 Sheets-Sheet 3
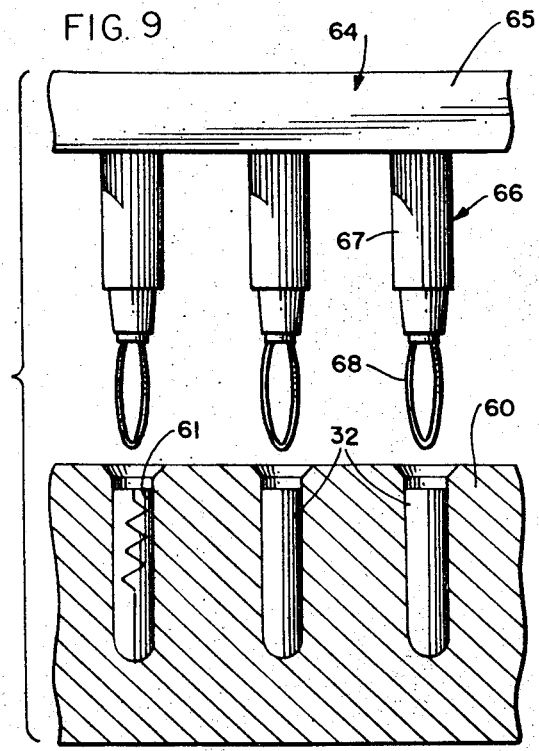
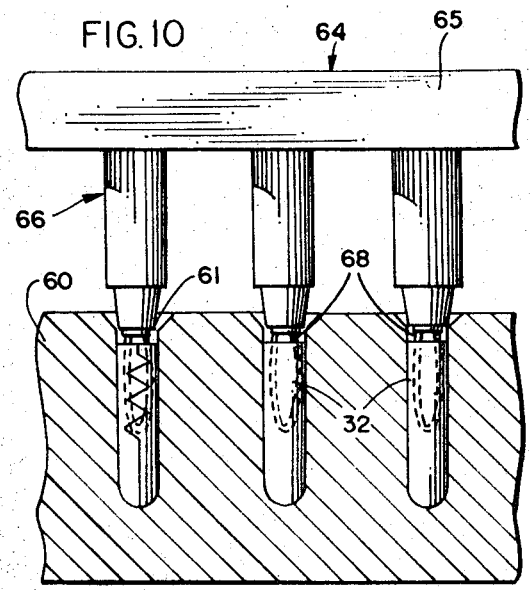
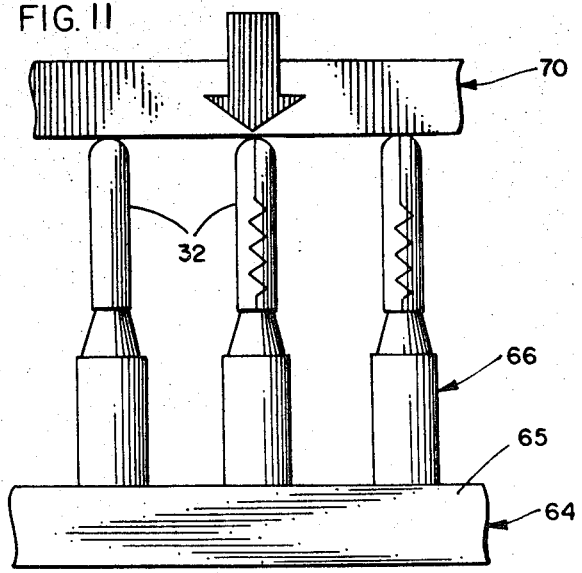
INVENTOR:
JOHN L. YONKERS
BY
Mason, Kolehmainen, Rathburn & Wyss
ATT'YS Patented May 11, 1971

INVENTOR:
JOHN L. YONKERS
BY
Mason, Kolehmainen, Rathburn & Wyss
ATT'YS

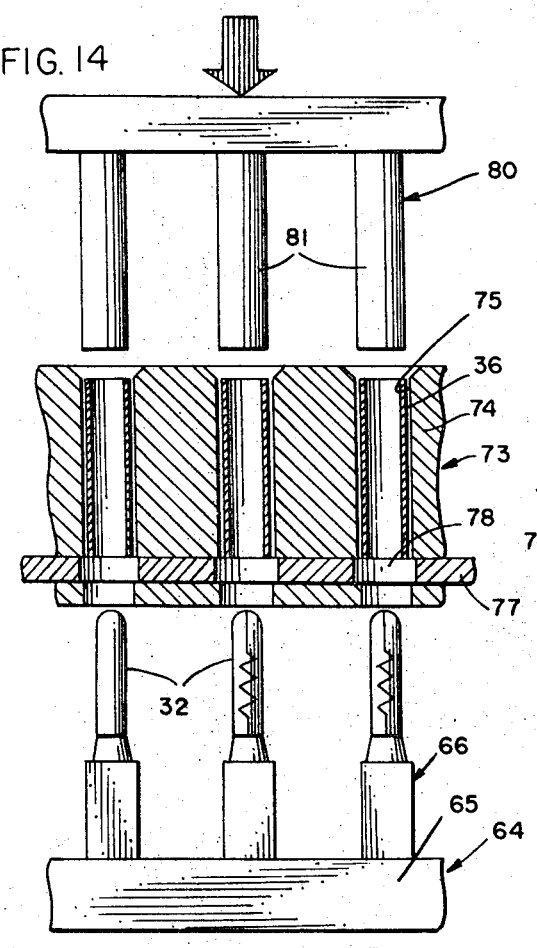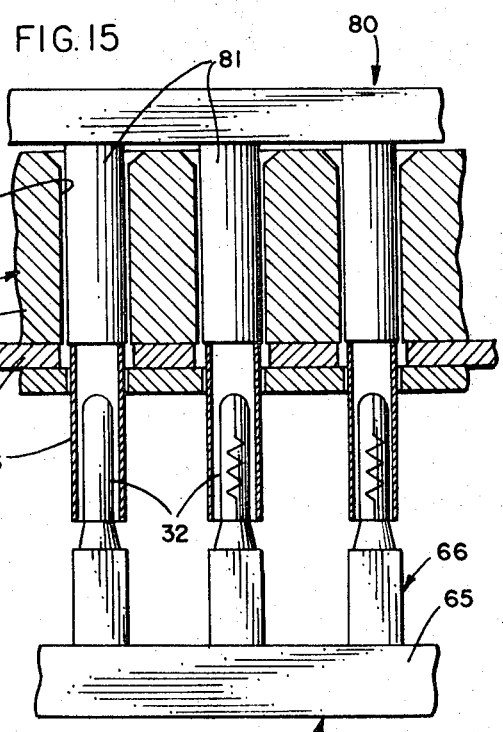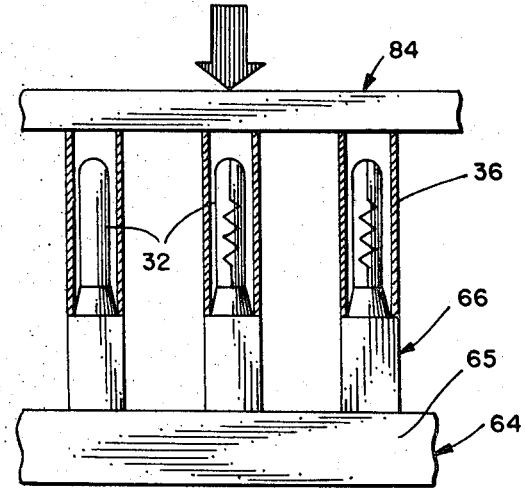

Patented May 11, 1971
3,578,189
6 Sheets-Sheet 6
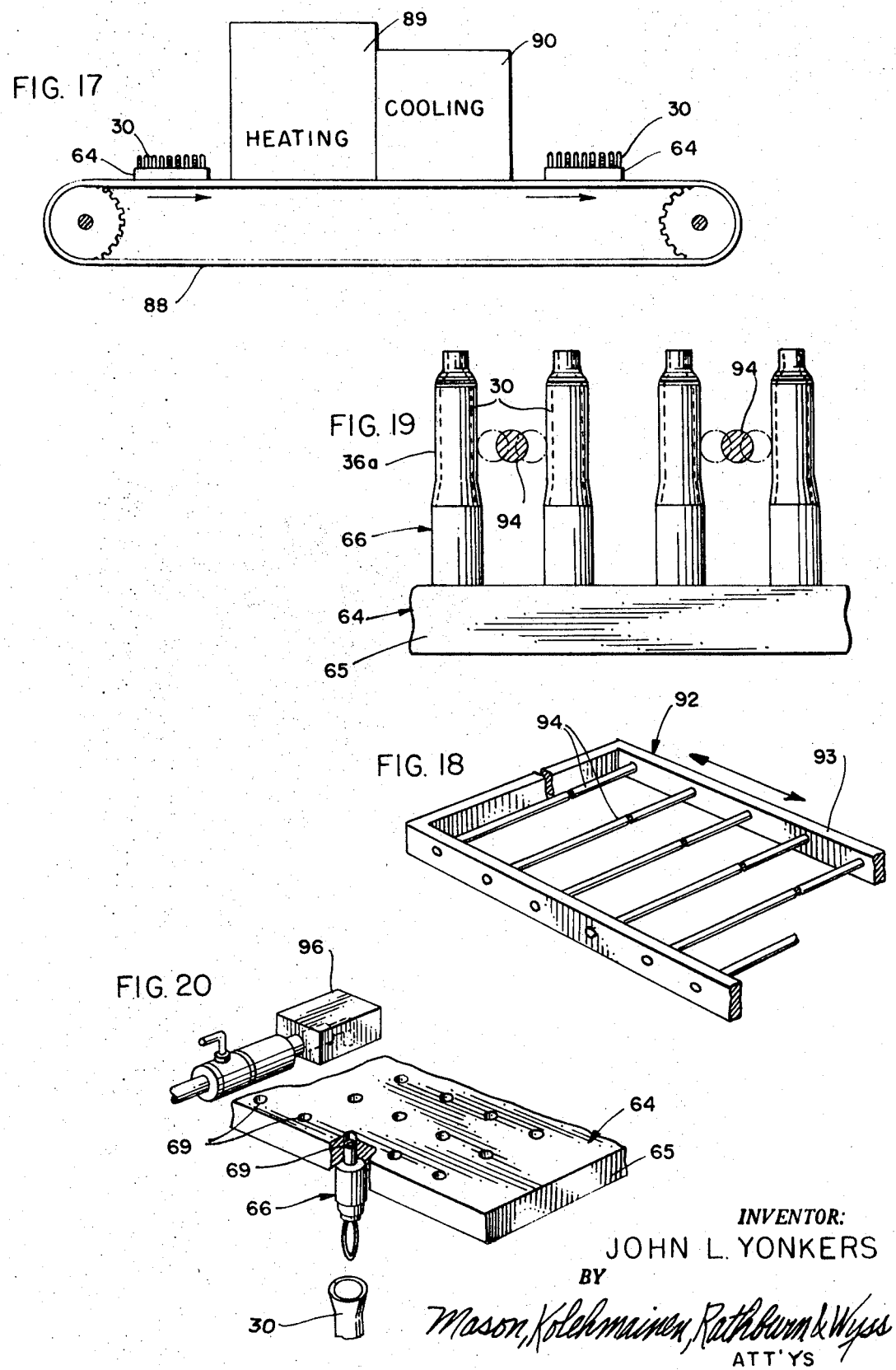
INVENTOR:
JOHN L. YONKERS
BY
Mason, Kolehmainen, Rathburn & Wyss
ATT'YS

METHOD FOR ORIENTING AND ASSEMBLING SMALL PARTS

This application is a division of application Ser. No. 498,710 filed Oct. 20, 1965, now U.S. Pat. No. 3,468,024 issued Sept. 23, 1969.

The present invention relates to a method and apparatus for orienting and assembling connectors, and more particularly, to a method and apparatus for orienting and assembling very large quantities of small parts such as used for solderless electrical connectors.

One commercial form of electrical connector used for solderless connections of telephone circuits and the like includes a shell-shaped connector member closed at one end and open at the other and provided with an outer insulated jacket. The connector member includes an inner insert having a plurality of inwardly extending sharp projections. In use the conductors to be joined are merely slipped inside the inner insert and the connector member is squeezed to drive the projections through the insulation of the conductors and to form a solderless connection. Although the assembly and further working of any one connector is readily accomplished by hand or other methods, the quantities processed may reach into several million units per week. Accordingly it is necessary economically to process or assemble the connectors in an extremely fast and inexpensive manner. Moreover it has been found that the inner inserts in the connector members may sometimes buckle during insertion and accordingly it is further necessary to properly gauge the internal parts of the connector members prior to the completion of their assembly.

Accordingly it is an object of the present invention to provide a new and improved method for properly positioning or orienting very large quantities of small parts for additional processing.

A further object of the present invention is to provide a new and improved method for assembling connectors.

Yet a further object of the present invention is to provide a new and improved apparatus for properly positioning or orienting very large quantities of small parts for additional processing.

Yet a further object of the present invention is to provide a new and improved apparatus for assembling large quantities of very small parts.

Yet a further object of the present invention is to provide a new and improved apparatus for holding very small parts in proper position during the assembly thereof with other parts.

A further object of the present invention is to provide a new and improved method and apparatus for assembling connectors.

Yet a further object of the present invention is to provide a vibratory orienting system for handling and processing small parts.

Further objects and advantages of the present invention will become apparent as the following description proceeds with the features of novelty which characterize the invention will be pointed out with particularity in the claims annexed to and forming a part of this specification.

In accordance with these and other objects of the present invention, there is provided an improved method of assembling connectors of the type formed of a shell-shaped connector member closed at one end and open at the other end provided with an outer insulated jacket. The method according to the present invention is based on the positioning, processing, and assembling of batch quantities of the connectors at one time. More particularly according to one embodiment of the present invention, 814 of the connectors would be processed in one batch. However any convenient quantity, such as 1,000 connectors, may be processed at a time.

The method according to the present invention includes first positioning of a guage plate having a plurality of guide pins and assembling therewith an orienting plate with a plurality of chamfered openings so that a guage pin of the gauge plate extends through a respective one of the openings in the orienting plate. The orienting plate and guide plate are assembled on a vibrator and a random supply of shell-shaped connector members are scooped over the orienting plate. The plate assembly is then violently vibrated vertically to simultaneously fill a majority of the holes with connector members. The gauge pins prevent the closed ends of the connector members from entering the openings and at the same time gauge the inner size of the inner inserts and reject any of the connector members which are undersized. The orienting plate may then be removed thereby exposing the inverted, oriented connector members which were supported by the gauge pins on the gauge plate. Thereafter a transfer plate is assembled over the gauge plate with a plurality of transfer cavities for loosely receiving respective connector members. The assembled transfer plate and gauge plate can then be inverted and the plates separated. The transfer plate is then assembled with a rack of a type having a plurality of fingers frictionally engaging within the inner inserts of the conductor members. The transfer plate is then removed to provide a rack supporting the connector members.

To properly align and position the short lengths of insulated jacketing required of each conductor, a random supply of tube-shaped insulating jackets are provided over a jacket-orienting plate of the type having a plurality of chamfered jacket openings. The jacket-orienting plate is then violently vibrated vertically to fill respective jacket openings with jackets. The jacket orienting plate is then brought in aligned relation with the rack and the jackets are transferred to respective connector members providing the connector assemblies.

To complete the processing of the connector, the connectors on the rack are then passed through a heating furnace to provide for heat shrinking of the jackets on the connector members. The connectors on the transfer plate are then mechanically stricken to loosen the connectors on the fingers and the individual connectors may be blown from the transfer plate with pressurized fluid.

The present invention also relates to an apparatus for assembling the electrical connectors. In one aspect the apparatus includes a vibratory orienting machine for the simultaneous orienting and gauging the inner size of a plurality of shell-shaped connector members and includes a plate assembly including the gauge plate having a plurality of upstanding gauge pins and an orienting plate having a plurality of openings chamfered at the top and assembled with the gauge plate so that a gauge pin extends into each of the openings. The assembled plates define a plurality of chamfered cavities with the gauge pins extending up from the bottom of the cavities. Means are provided for violently vibrating the plates in unison in a vertical direction thereby to orient connector members into the openings and onto the gauge pins.

In accordance with yet another aspect of the present invention there is provided an improved rack for holding a plurality of the shell-shaped connector members. The plate includes a rack base and a plurality of upstanding finger assemblies. Each of the finger assemblies includes a hollow cylindrical finger body and an elongated electrical spring extending from the finger body. The spring is adapted to enter the inner insert to frictionally grip the connector members. Moreover each rack base is provided with a plurality of holes, each aligned with one of the hollow finger bodies to provide for the passage of pressurized fluid therethrough to facilitate the removal of the connectors from the transfer plate.

For a better understanding of the present invention, reference may be had to the accompanying drawings wherein:

FIG. 1 is a series of perspective views illustrating various steps in the assembly of a typical connector according to the present invention;

FIG. 2 is an exploded perspective view of the vibratory orienting machine according to the present invention.

FIG. 3 is a fragmentary cross-sectional view illustrating the orientation of the connector members onto the gauge plate;

FIG. 4 is a fragmentary cross-sectional view illustrating a plurality of connector members assembled on the gauge pins of the gauge plate;

FIG. 5 is a fragmentary cross-sectional view, similar to FIG. 4, shown with the orienting plate removed;

FIG. 6 is a fragmentary cross-sectional view, similar to FIG. 5, and further illustrating the transfer plate prior to assembly with the connectors on the gauge pins;

FIG. 7 is a fragmentary cross-sectional view of the apparatus of FIG. 6 shown with the transfer plate thereof in assembled relation over the connector members;

FIG. 8 is a fragmentary cross-sectional view of the subsequent step after FIG. 7, illustrated with the gauge plate removed and the transfer plate inverted;

FIG. 9 is a fragmentary cross-sectional view of the assembly apparatus according to the present invention and illustrating the step subsequent to that of FIG. 8 with the rack in position above the transfer plate;

FIG. 10 is a fragmentary cross-sectional view of the assembly apparatus illustrating the step subsequent to that of FIG. 9 with the rack assembled with the connector member;

FIG. 11 is a fragmentary cross-sectional view of the assembly apparatus illustrating the step subsequent to that of FIG. 1 with the transfer plate removed and further with the connector members fully assembled on the fingers of the rack;

FIG. 14 is a fragmentary cross-sectional view of the assembling apparatus illustrated with the jacket-orienting plate in a press over the rack;

FIG. 15 is a fragmentary cross-sectional view of an assembling apparatus according to the present invention illustrating a step subsequent to that of FIG. 14 with the jackets partially assembled on the connector member;

FIG. 16 is a fragmentary cross-sectional view of the assembling apparatus according to the present invention illustrating a step subsequent to that of FIG. 15 and shown with the jackets fully assembled on the connector member;

FIG. 17 is a somewhat schematic representation of the heat-shrinking process for curing the heat shrinkable insulating jackets according to the present invention;

FIG. 18 is a perspective view of a striking rack for loosening the completed connectors from the fingers of the rack;

FIG. 19 is a fragmentary cross-sectional view of the assembling apparatus illustrating the use of the striking rack of FIG. 18; and FIG. 20 is a fragmentary perspective view of the assembly apparatus according to the present invention illustrating the blowing of the connector members from the rack.

Figure 12:
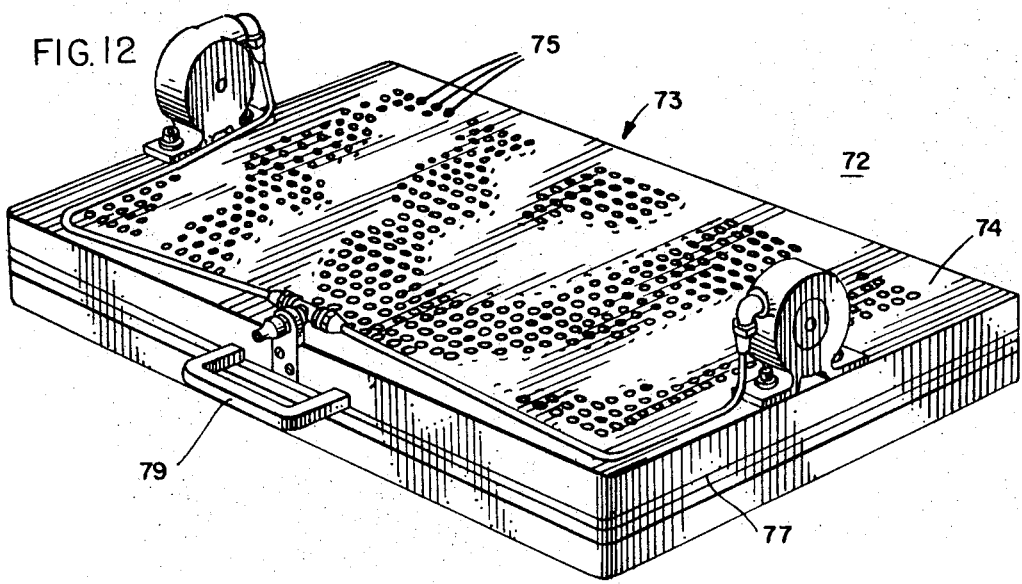
FIG. 12 is a perspective view of a jacket orienting plate according to the present invention.
Figure 13:
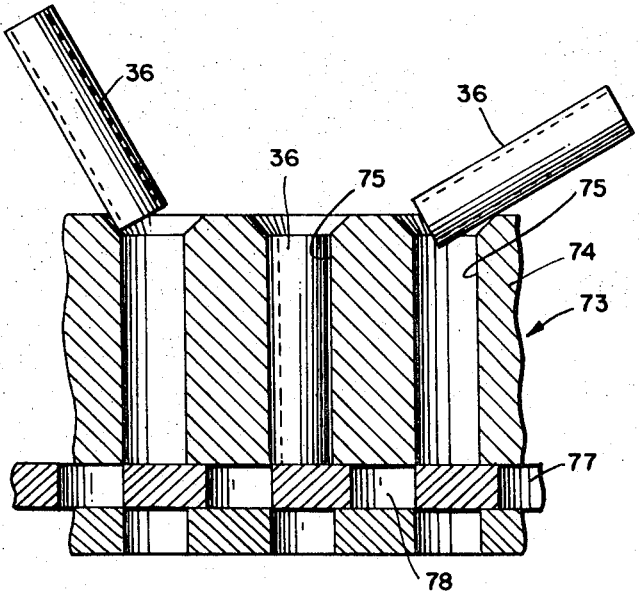
FIG. 13 is a fragmentary cross-sectional view of the jacket orienting plate, illustrated during the vibrating operation of the jacket-orienting plate.

Referring now to the drawings, and first to FIG. 1 thereof, there is illustrated a typical connector 30 according to the present invention. The connector 30 includes a shell-shaped connector member 32 closed at one end and open at the other, and containing an inner insert 33. The inner insert 33 is somewhat cylindrical in shape, being formed from a section of sheet material 33a, and containing a plurality of inwardly extending sharp projections 34. The connector member 32 is encased in a tube-shaped insulating jacket 36 of heat shrinkable material such as polyolefin insulation. The connector 30 is subsequently heat treated to heat shrink the insulating jacket to provide a tight-fitting jacket 36a as a completed connector. To use the connector it is merely necessary to insert the terminals 37 into the open end of the connector member 32 and to squeeze the connector 30 together, as illustrated by the arrows 38. The projections 34 cut through the insulation on the terminals 37 to make electrical connection with the terminals.

In accordance with the present invention, FIG. 2 illustrates a vibratory orienting machine 39 for simultaneously orienting and gauging the inner size of a plurality of the shell-shaped connector members. As therein illustrated the vibratory orienting machine 39 includes a plate assembly 40 defined by a gauge plate 42 and an orienting plate 43 which may be of Lucite or other suitable material. A plurality of aligning pins 44 fit through respective aligning openings 45 on the orienting plate 43 to provide for accurately aligning the plates 42 and 43 together. The gauge plate 42 is mounted on a pair of crossbars 47a, 47b containing rollers 48 at their edges and riding on spaced tracks 49. Respective end stops 50 prevent the rollers 48 from overrunning the tracks. In order to vibrate the plate assembly 40, there is provided suitable vibrators 52 which will provide vertical vibration to the plate assembly 40. Suitable clamps 53 are provided for holding the plates 42 and 43 in assembled relation.

To provide for internally gauging the inner inserts 33 and to reject connector members 32 which have crinkled or are otherwise defective, the gauge plate 42 is provided with a plurality of upstanding gauge pins 55, best illustrated in FIGS. 3 through 6, here shown as 814 in number, but which may be of any suitable number. Moreover the orienting plate 43 is provided with a plurality of openings 56, chamfered at their upper end as illustrated at 56a. A gauge pin 55 extends through each of the openings 56.

In order to orient and position a plurality of the connector members 32 onto the respective gauge pins 55 of the gauge plate 42, the gauge plate is positioned as illustrated in FIG. 1 with the gauge pins extending upwardly. Thereafter an orienting plate 43 is assembled over the gauge plate and clamped thereto. A random supply of the shell-shaped connector members 32 are scooped over the orienting plate and the plate assembly 40 is violently vibrated vertically. Simultaneously a majority of the openings 56 are filled with connector members 32 inverted over the gauge pins 55, while the gauge pins 55 will reject any connector members 32 undersized with reference to their central opening. Any such connector members 32 having undersized inner inserts, due to buckling or otherwise, will not fall onto the gauge pins 55. Moreover the pins 55 are effective to prevent the connector members 32 from entering the opening 56 upside down—that is, all of the connector members 32 received on the gauge pin 55 must necessarily be received with a gauge pin 55 extending through the open end thereof, as best illustrated in FIGS. 3 and 4.

Once the openings 55 in the plate assembly 40 each contain a suitable connector member 32, or, alternatively, reject defective connector members, then the orienting plate 43 may be removed to expose the gauge plate 42 supporting a plurality of good connector members 32 on its gauge pin 55, as best illustrated in FIG. 5. A pair of handles 57 provided on opposite ends of the orienting plate 43 provide for easy removal thereof.

In order to transfer the connector members 32 to suitable racks for further processing, there is provided a transfer plate 60 provided with a plurality of transfer cavities 61 and alignable with respective ones of the connector members 32 supported on the gauge pin 55, as best illustrated in FIG. 6. The transfer cavities 61 may be chamfered at their open end and are provided with a closed bottom for loosely receiving in their respective connector members 32. As illustrated in FIG. 7, the transfer plate 60 is brought down over the upstanding connector members 32 and then the assembly of the transfer plate 60 with the gauge plate 42 is inverted. The inversion may readily be accomplished on the vibrator illustrated in FIG. 2 by manually gripping one of the crossbars, for example, bar 47a, and lifting the crossbar 47a while simultaneously moving the other crossbar 47b over the tracks 49 and against the far one of the stops 50, and then completing the inversion of the plate assembly by setting the bar 47b down on the track 49. In this manner it is necessary only to raise one end of the plate assembly to accomplish the inversion. Once the transfer plate 60 and gauge plate 42 have been inverted, the connector members 32 will drop freely off the gauge pins 55. However to minimize any possibility of the connector members 32 hanging upon the gauge pins 55, the vibratory orienting machine 39 may be vibrated slightly to jar loose the connector members 32.

To provide for holding the connector members 32 during further processing, there is provided a suitable rack 64. The rack 64 is provided with a rack base 65 supporting a plurality of finger assemblies 66 adapted to engage respective ones of the connector members 32. Each of the finger assemblies 66 as best illustrated in FIG. 9, includes a hollow cylindrical finger body 67 and an elongated elliptical spring 68 extending from the finger body 67 for gripping within the respective ones of the connector members 32. Moreover each of the finger bodies 67 and the rack base 65 is provided with an aligned opening 69.

The connector members 32 held in the transfer plate 60 may readily be picked up by the rack 64 by first bringing the spring 68 into frictional engagement with the connector members 32, as illustrated in FIG. 10, and thereafter removing the transfer plate 60. The connector members 32 will be frictionally held on the respective springs 68. In order to complete the transfer of the connector members 32 onto the rack 64, it may be desirable to press the connector members 32 onto the rack, to complete the assembly, by means of a suitable press device 70, FIG. 11. The connector members 32 on the rack 64 are now ready to receive suitable insulating jackets or to be further processed in a suitable manner.

In order to orient a plurality of the insulating jackets 36 to be assembled with the connector members 32 on the rack 64, there is provided a vibratory orienting machine 72, working on somewhat the same principle as the vibratory orienting machine 39, and comprising a jacket-orienting plate 73 including a body portion 74 provided with a plurality of chamfered jacket openings 75. A stop plate 77 is slidably fastened intermediate the depth of the body portion 74 and is provided with a plurality of openings 78 which are alignable with the jacket openings 75. However in the normal position of the stop plate 77, the stop plate 77 is biased in any suitable manner as by a spring so that the openings 78 are not in alignment with the jacket openings 75 and therefore the stop plate 77 is effective to block the jackets 36 from falling through the jacket-orienting plate 73. A handle 79 secured to the stop plate 77 is effective to move the stop plate 77 to align the openings 78 with the openings 75, as best illustrated in FIG. 14, thereby to permit the jackets 36 to drop through the jacket-orienting plate 73. To positively drive the jackets 36 through the plate 73, a press 80 is provided with a plurality of ejecting fingers 81 which can be driven through the jacket openings 75 to drive the jackets 32 onto the connector members 32 held on the rack 64, as best illustrated in FIG. 15. It will be understood that the jackets 36 will normally fall by gravity until they engage the connector members 32. However to prevent the jackets 36 from holding up or binding, the ejecting fingers 81 will drive the jackets 64 onto the connector members 32.

To fully seat the jackets 36 on the connector members 32, the final assembly of the insulting jackets 36 with the connector members 32 may be accomplished with a conventional press 84, fragmentarily illustrated in FIG. 16.

Once the assembly of the connectors 30 is complete, then the rack 64 containing the connectors 30 are passed through a suitable heat-shrinking furnace. Such a furnace is shown somewhat schematically in FIG. 17. The rack 64 containing the connectors 30 are placed on a suitable conveyor 88 where they pass first into a heating compartment 89 and then into a cooling compartment 90. Advantageously the batch operation of the present assembly adapts itself to comparatively low temperature heating for slightly longer periods of time. In the instant case it has been found that heat treating the connectors at 280° F. for 6 minutes provides a satisfactory heat shrinkage of the jackets. Excessive high temperature heating which might burn the jackets and cause brittleness and cracking of the jackets is prevented at 280° F.

After the rack 64 completes the shrinking process, the connectors 30 are ready to be removed from the racks. As the connectors 30 may bind on the springs 68 of the finger assemblies 66, the racks 64 containing the connectors 30 is first placed on a mechanical striking device having a striking rack 92, FIG. 18, adapted to strike and loosen the connectors 30. More specifically the striking rack 92 includes an outer frame 93 containing a plurality of spaced striking bars 94. The striking bars 94 are adapted to fit between pairs of rows of the connectors 30 on the rack 64, as illustrated in FIG. 19, and the striking rack 92 is vibrated back and forth to alternately impact against the connectors on each side of each of the respective bars 94.

Although the striking step loosens the connectors 30, the connectors 30 may finally be released from the finger assemblies 66 by directing pressurized fluid, such as compressed air, through the openings 69, as illustrated in FIG. 20. For this purpose there is supplied a manually held and controlled air nozzle 96 which an operator may run down the rows of opening 69 to drive the connectors 30 off the finger assemblies.

Although the present invention has been described as applicable to the assembly of one particular connector, it is understood that the vibratory matrix system of orienting small parts may be useful in other types of assembly operations. For example, the vibratory orienting machine 39 with a somewhat modified orienting plate 43 may be used for gauging and orienting the inner inserts 33 preliminarily to assembling them with the connector members 32. Moreover it is understood that although a single embodiment of the present invention has been described, it will be apparent that numerous other modifications and embodiments may be devised by those skilled in the art and it is intended by the appended claims to cover all modifications and embodiments which will fall within the true spirit and scope of the present invention.

I claim:

1. A method of simultaneously orienting and gauging the internal and external diameters of small hollow parts comprising the steps of:

positioning a gauge plate having a plurality of gauge pins with the gauge pins upstanding;

assembling an orienting plate having a plurality of openings over said gauge plate with each gauge pin thereof extending through a respective one of said openings;

providing a random supply of parts over said orienting plate;

violently vibrating the plate assembly to simultaneously fill a majority of said holes with parts on said gauge pins while rejecting parts undersized from being received on said guage pins;

removing said orienting plate to expose the parts;

assembling a transfer plate having a plurality of transfer cavities for receiving respective ones of the parts against said gauge plate with the parts supported on the gauge pins being received in said transfer cavities;

inverting the assembly of said transfer plate with said gauge plate to permit the parts to move into the transfer cavities; and separating said gauge plate and said transfer plate.

2. A method of simultaneously orienting and gauging the internal and external diameters of small hollow parts comprising the steps of:

positioning a gauge plate having a plurality of upstanding gauge pins;

assembling an orienting plate having a plurality of openings over the first-mentioned plate with each gauge pin thereof extending through a respective one of said openings;

providing a random supply of said parts over said orienting plate; and violently vibrating the plate assembly to simultaneously fill a majority of said holes with said hollow parts fitted over said gauge pins.

3. A method as set forth in claim 2 wherein said vibrating step comprises vertically vibrating of the plate assembly.